United States Patent [19]

Nishii et al.

[11] Patent Number: 4,683,807
[45] Date of Patent: Aug. 4, 1987

[54] VACUUM BRAKE BOOSTER ASSEMBLY

[75] Inventors: Michiharu Nishii; Youichi Furuta; Kaoru Tsubouchi, all of Kariya; Takeo Murata, Toyota; Juichi Shibatani; Takashi Kiriyama, both of Toyota, all of Japan

[73] Assignees: Aisin Seiki Kabushiki Kaisha, Kariya; Toyota Jidosha Kabushiki Kaisha, Toyota, both of Japan

[21] Appl. No.: 638,772

[22] Filed: Aug. 8, 1984

[30] Foreign Application Priority Data

Aug. 8, 1983 [JP] Japan .......................... 58-123028[U]

[51] Int. Cl.$^4$ .............................................. F01B 11/02
[52] U.S. Cl. ....................................... 92/169; 181/200
[58] Field of Search ................. 92/169.4, 169.3, 169.2, 92/169 R, 171, 144; 181/198, 202, 201, 243, 200; 60/547.1; 180/90.6

[56] References Cited

U.S. PATENT DOCUMENTS

| | | | |
|---|---|---|---|
| 733,379 | 7/1903 | Felt | 181/201 |
| 3,012,544 | 12/1961 | Pulkownik | 91/376 X |
| 3,125,003 | 3/1964 | Hoekstra | 91/376 R |
| 3,799,703 | 3/1974 | Paine et al. | 181/202 |
| 3,996,913 | 12/1976 | Hamparian | 92/144 X |
| 4,022,112 | 5/1977 | Putt et al. | 91/369 A |
| 4,135,830 | 1/1979 | Hishida et al. | 181/201 |
| 4,146,112 | 3/1979 | Usry | 181/202 |
| 4,408,679 | 10/1983 | Littrell | 181/243 |
| 4,442,419 | 4/1984 | Kanoi et al. | 181/202 |

FOREIGN PATENT DOCUMENTS 0104105 8/1983 European Pat. Off. .
2091828 1/1981 United Kingdom .

Primary Examiner—Robert E. Garrett
Assistant Examiner—Mark A. Williamson
Attorney, Agent, or Firm—Oblon, Fisher, Spivak, McClelland & Maier

[57] ABSTRACT

A vacuum brake booster assembly comprising front and rear housing shells connected to form a single piece their output peripheral edges and mounted within the passenger compartment of a vehicle, a piston body axially movable in the housing shells, a diaphragm member hermetically secured at its inner peripheral edge to the piston body and clamped at its outer peripheral edge by the outer peripheral edges of the housing shells to subdivide the interior of the housing shells into a vacuum chamber and a variable pressure chamber, and a pressure control valve cooperable with the piston body for selectively communicating the variable pressure chamber to the vacuum chamber or the atmospheric air in response to movements of the piston body, wherein at least the rear housing shell is formed as a double or multi layer wall for the variable pressure chamber to dampen air suction noises caused by expansion and vibration of the air flowing through the valve into the variable pressure chamber from the passenger compartment in response to actuation of the brake booster assembly.

5 Claims, 2 Drawing Figures

VACUUM BRAKE BOOSTER ASSEMBLY

BACKGROUND OF THE INVENTION

1. Field of the Invention

The present invention relates to a vacuum brake booster assembly for automotive vehicles, and more particularly to a vacuum brake booster assembly of the type which comprises a housing assembly including front and rear housing shells connected integrally to each other at their outer peripheral edges and mounted within the passenger compartment of the vehicle, a piston body axially movable in the housing assembly, a diaphragm member hermetically secured at its inner peripheral edge to the piston body and clamped at its outer peripheral edge by the outer peripheral edges of the housing shells to subdivide the interior of the housing assembly into a vacuum chamber and a variable pressure chamber, and a pressure control valve cooperable with the piston body for selectively communicating the variable pressure chamber with the vacuum chamber or the atmospheric air in the passenger compartment.

2. Discussion of the Background

In this type of vacuum brake booster assembly, it is advantageous that the variable pressure chamber is communicated with the clean air from the passenger compartment of the vehicle. It has, however, been experienced that there occurs unpleasant air suction noises caused by expansion and vibration of the air flowing through the control valve from the passenger compartment into the variable pressure chamber in response to actuation of the brake booster. Such unpleasant air suction noises propagate into the passenger compartment through the housing shells and are amplified by resonance of a dash panel to which the brake booster assembly is fastened. Such an undesired phenomenon is accentuated in the case that the housing shells, the dash panel and the like are structurally made as thin as possible. To solve the problems, it has been proposed to attach a dampening member to the dash panel or to increase the thickness of the dash panel. This results in difficulty in attachment of the dampening member or an increase in material cost.

SUMMARY OF THE INVENTION

It is, therefore, a primary object of the present invention to provide an improved vacuum brake booster assembly which can be constructed in a simple and inexpensive manner to effectively block the propagation of air suction noises into the passenger compartment across the brake booster housing.

According to the present invention, the object is accomplished by providing an improved vacuum brake booster assembly of the type described above, in which at least the rear housing shell is formed as a double or multi-layer wall for the variable pressure chamber to dampen the air suction noises caused by expansion of the air flowing through the control valve from the passenger compartment into the variable pressure chamber in response to actuation of the brake booster assembly. Preferably, the double layer wall for the variable pressure chamber is formed by an asphalt sheet adhered to the outer surface of the rear housing shell or an asphalt sheet partly adhered to the outer surface of the rear housing shell except a portion fitted to a mounting bracket for the brake booster assembly. Alternatively, the rear housing shell is formed by multi-laminated dampening steel plates.

BRIEF DESCRIPTION OF THE DRAWING

Additional objects and advantages of the present invention will become readily apparent by reference to the following detailed description taken in conjunction with the accompanying drawing, in which.

DESCRIPTION OF THE PREFERRED EMBODIMENT

Figure 1:
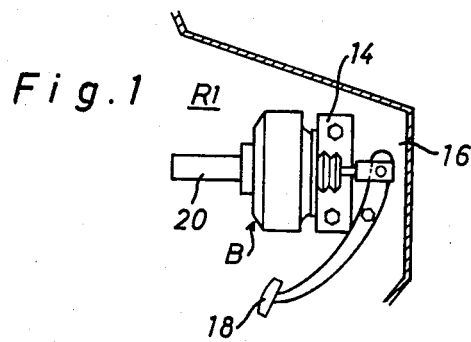
FIG. 1 schematically illustrates a vacuum brake booster assembly in accordance with the present invention which is mounted within the passenger compartment of an automotive vehicle.
Figure 2:
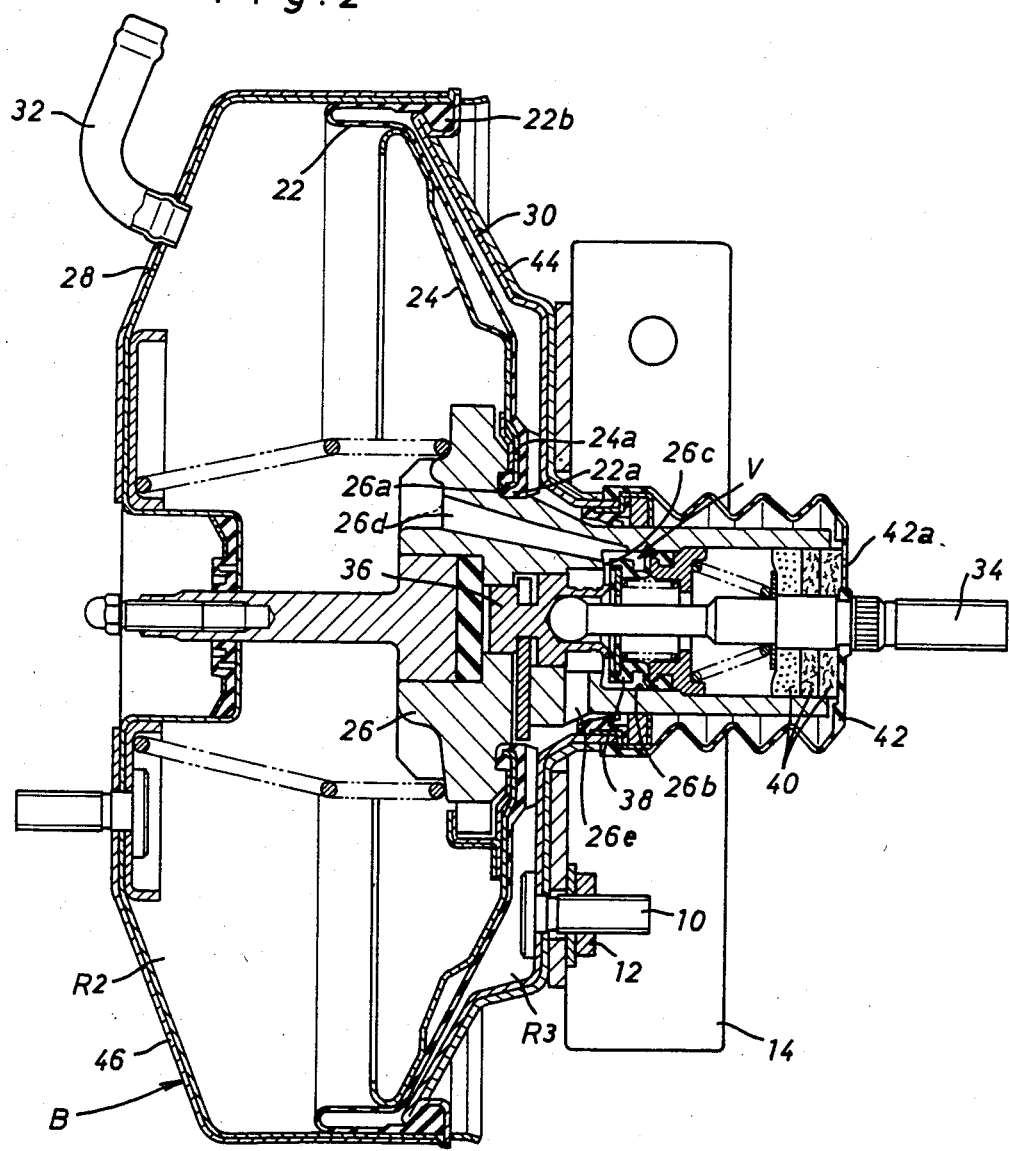
FIG. 2 is a longitudinal cross-sectional view of the brake booster assembly of FIG. 1.

Referring to FIGS. 1 and 2 of the drawing, a vacuum brake booster assembly B is located in the passenger compartment R1 of an automotive vehicle and fastened to a dash panel 16 of the vehicle body by means of a mounting bracket 14 fixed thereto by a bolt 10 and a nut 12. Assembled in a usual manner with the brake booster assembly B are a brake pedal 18 and a brake master cylinder 20. As can be well seen in FIG. 2, the brake booster assembly B comprises a vacuum housing assembly including front and rear housing shells 28, 30 connected to form a single piece at their outer peripheral edges, and a diaphragm member 22 which is supported by an annular support plate 24 fastened at its inner peripheral edge 24a to an annular flange of a piston body 26. The diaphragm member 22 has an inner peripheral edge 22a coupled over an annular stepped portion 26a of piston body 26 and secured hermetically in place by means of the inner peripheral edge 24a of plate 24 and has an outer peripheral edge 22b hermetically clamped by the outer peripheral edges of front and rear housing shells 28 and 30. With such an arrangement of the diaphragm member 22, the interior of the housing assembly is subdivided into a vacuum chamber R2 and a variable pressure chamber R3. The vacuum chamber R2 is constantly applied in a usual manner with a vacuum pressure through a port 32, while the variable pressure chamber R3 is selectively applied with the vacuum pressure or the atmospheric air in the passenger compartment by means of a pressure control valve V cooperable with the piston body 26.

The pressure control valve V comprises a valve plunger 36 connected to the inner end of a push rod 34 to be actuated by the brake pedal 18, and a valve assembly 38 axially slidably disposed within an inner bore 26b of piston body 26 to cooperate with the valve plunger 36 and an annular stepped portion 26c in piston body 26. When the valve assembly 38 is in engagement with the valve plunger 36 and apart from the annular stepped portion 26c, the variable pressure chamber R3 is connected to the vacuum chamber R2 via first and second passages 26d and 26e formed in piston body 26. When the valve assembly 38 is in engagement with the annular stepped portion 26c and apart from the valve plunger 36, the variable pressure chamber R3 is applied with the atmospheric air from the passenger compartment via the second passage 26e, the valve assembly 38, an air filter 40 and an air hole 42a of a boot 42.

In this embodiment, the housing assembly for the brake booster is characterised in that an asphalt sheet 44 is adhered along its entirety to the outer surface of rear housing shell 30 to provide the peripheral wall of variable pressure chamber R3 in the form of a double layer wall. Owing to provision of the double layer wall 30, 44, it is able to dampen the air suction noises caused by sudden expansion and vibration of the air flowing through the pressure control valve V into the variable pressure chamber R3 from the passenger compartment in response to actuation of the push rod 34. This serves to restrain resonance of the rear housing shell 30 and propagation of the air suction noises into the passenger compartment. In this embodiment, an asphalt sheet 46 is additionally adhered along its entirety to the outer surface of front housing shell 28 to provide the peripheral wall of vacuum chamber R2 in the form of a double layer wall. Owing to provision of the double layer wall 28, 46, it is also able to dampen the air suction noises caused by expansion and vibration of the air flowing through the pressure control valve V from the variable pressure chamber R3 into the vacuum chamber R2 in response to release of the push rod 34. This serves to restrain resonance of the front housing shell 28 and propagation of the air suction noises into the passenger compartment.

In the actual practice of the present invention, a dampening steel plate may be further adhered to the outer surface of asphalt sheet 44 to provide the peripheral wall of the variable pressure chamber R3 in the form of a three layer wall. Alternatively, the asphalt sheet 44 may be replaced with a dampening steel plate, and the rear housing shell 30 may be formed by multi laminated dampening steel plates. Furthermore, the asphalt sheet 44 may be partly adhered to the outer surface of rear housing shell 30 except a portion fitted to the mounting bracket 14. The asphalt sheet 46 adhered to the outer surface of front housing shell 28 may be eliminated because the air suction noises in release of the brake booster is relatively small.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. A vacuum-actuated brake power booster assembly for an automobile having a dash panel located in a passenger compartment and a mounting bracket arranged in the passenger compartment and fixed to said dash panel, comprising:

a housing assembly which includes front and rear housing shells divided internally by a diaphragm and a power piston into a vacuum chamber and a variable pressure chamber, said housing assembly being mounted on said bracket in such a manner that the rear housing shell faces said dash panel; and a noise dampening sheet secured along its entirety to the outer surface of the rear housing shell so as to be located between said outer surface of the rear housing shell and said mounting bracket and form an external wall for the variable pressure chamber in such a manner that the rear housing shell is exposed only in a zone which is fitted in use to said mounting bracket.

2. An assembly according to claim 1, wherein the noise dampening sheet further comprises a first asphalt sheet adhered along its entirety to the outer surface of the rear housing shell.

3. An assembly according to claim 2, further comprising a steel plate adhered along its entirety to the outer surface of said first asphalt sheet in such a manner that the rear housing shell is exposed only in the zone which is fitted to the mounting bracket.

4. An assembly according to claim 2, further comprising a second asphalt sheet which is adhered along its entirety to the outer surface of the front housing shell so as to form an external wall for the vacuum chamber to dampen noises caused by air exhausted from the variable pressure chamber via the vacuum chamber in use.

5. An assembly according to claim 1, wherein the noise dampening sheet further comprises a steel plate connected to the outer surface of noise dampening sheet.

* * * * *